Jan. 27, 1953 J. F. CHAMBERLIN 2,626,814
FOLDABLE GOLF CART
Filed April 30, 1949 2 SHEETS—SHEET 1
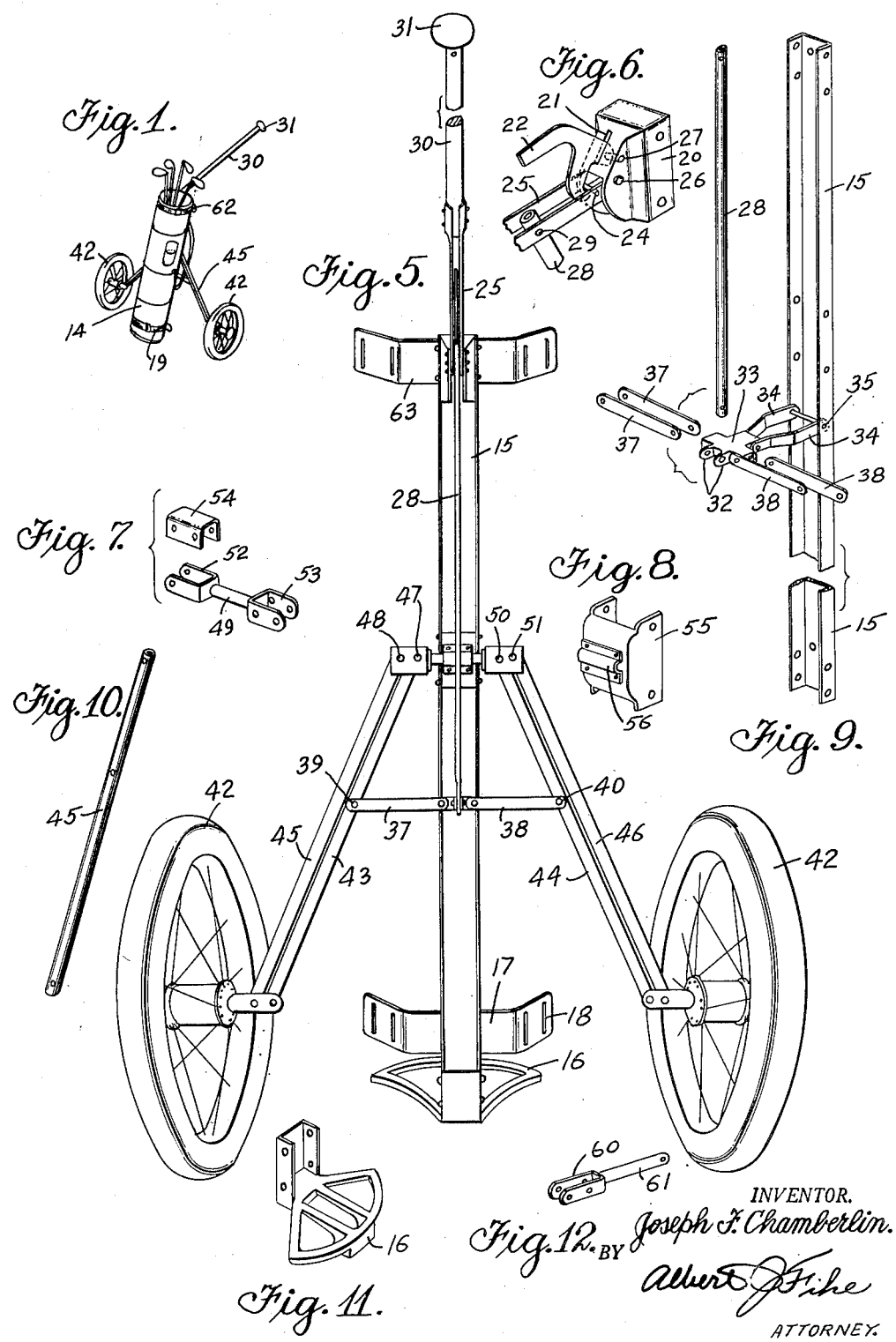
INVENTOR.
Joseph F. Chamberlin.
BY Albert J. Fihe
ATTORNEY.

Jan. 27, 1953     J. F. CHAMBERLIN     2,626,814
FOLDABLE GOLF CART
Filed April 30, 1949     2 SHEETS—SHEET 2
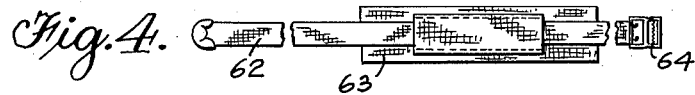
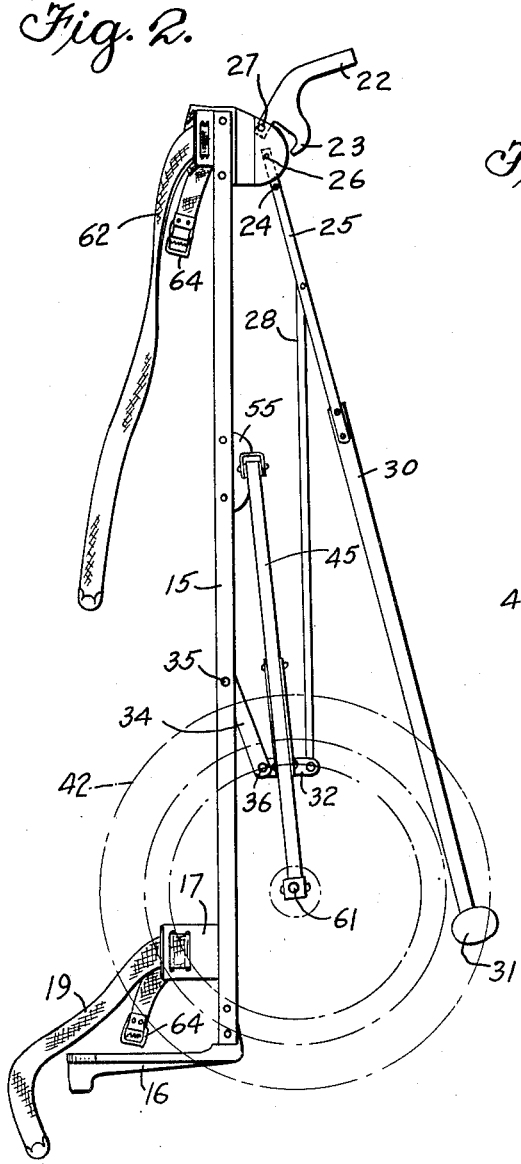
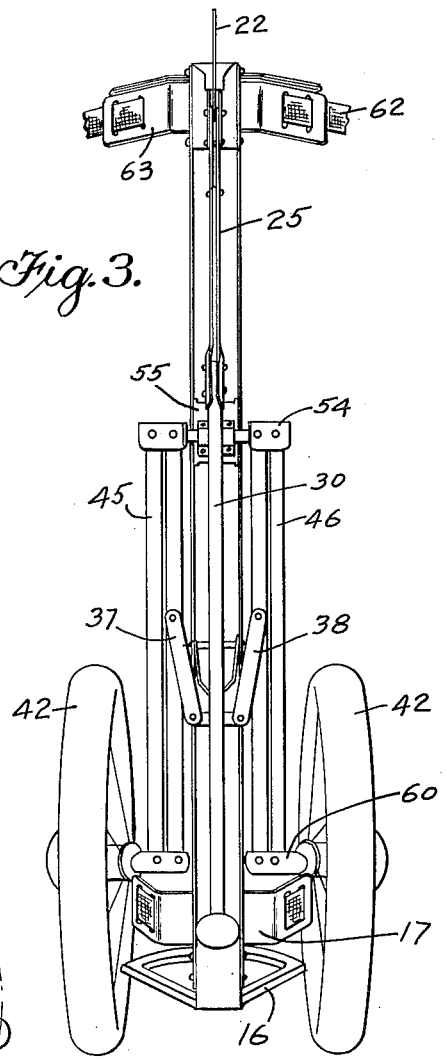
INVENTOR.
Joseph F. Chamberlin.
BY Albert J. Fihe
ATTORNEY.

Patented Jan. 27, 1953

2,626,814

UNITED STATES PATENT OFFICE 2,626,814

FOLDABLE GOLF CART

Joseph F. Chamberlin, Chicago, Ill.

Application April 30, 1949, Serial No. 90,607

6 Claims. (Cl. 280—42)

This invention relates to an improved telescoping golf cart and the present application is a continuation in part and is directed to improvements over my prior application for patent on collapsible golf cart, Serial No. 748,525, filed May 16, 1947.

One of the important objects of this invention is to provide a telescoping golf cart which is adapted to efficiently transport a golf bag and set of golf clubs over a golf course without tiring the player and without any danger of upsetting and spilling the clubs.

Another object is to provide a telescoping golf cart which, when not in use, can be readily folded into a small compass whereby it can be stored in a locker or in the trunk of an automobile and may also be readily transported from place to place with minimum difficulty.

Yet another object is to provide a telescoping cart or the like which is sturdy of construction, simple of operation, easily manipulated and not likely to get out of order.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the improved telescoping golf cart of this invention showing the same in extended and operative relationship with a golf bag thereon.

Figure 2 is a side elevation of the telescoping cart showing the same in collapsed or folded position and ready for storage or transportion.

Figure 3 is an end view of the telescoped or collapsed cart taken from the right hand side of Figure 2.

Figure 4 is a plain view of the golf bag supporting strap at the top of the cart and the means for maintaining the strap itself in position. This view is taken from the front of the cart.

Figure 5 is a view similar to Figure 3 but showing the cart in extended operating position.

Figure 6 is a detailed perspective view of the upper end of the handle construction and the locking means therefor and shows the handle in extended position.

Figure 7 is a perspective exploded view of the elements which maintain the wheel supporting struts in position on the body of the cart and the arrow from the circle surrounding this figure is directed to the corresponding parts on Figure 5.

Figure 8 is a detail enlarged perspective view of the supporting bracket for the structure of Figure 7 and the location and relationship of this part to the remainder of the structure is also indicated by the arrow leading from this figure.

Figure 9 is a detail exploded view of the channel which comprises the main body of the cart and that portion of the associated structure whereby the wheels are extended at the same time that the handle is raised. The arrow leading from this figure indicates the location of the illustrated parts on the cart itself.

Figure 10 is a perspective view of one of the tubular wheel supporting elements or struts and the arrow shows its location in the assembly.

Figure 11 is a perspective view of the bag supporting base of the cart.

Figure 12 is a detail perspective view of one of the wheel axles and its associated support.

As shown in the drawings:

The reference numeral 14 indicates a golf bag or similar device which is adapted to be supported and transported by the improved telescoping cart of this invention. Obviously, other articles can be carried, if desired, with little or no change in the cart construction but the cart is primarily for golfers.

The main body of the cart comprises a channel-like structure 15 which is preferably composed of some durable light metal, such as aluminum, and which can be made with a certain amount of inherent flexibility whereby the cart itself will be rendered more adaptable for movement over uneven ground, as the body will twist or weave slightly rather than remain too rigid under such circumstances.

A golf bag supporting base 16 is fastened at the lower end of the body 15 by means of rivets or the like and is of suitable size and shape as best shown in Figures 5 and 11.

Just above the base 16 and also fastened to the lower end of the body 15 is a metal plate 17 having slots 18 therein for the reception of a strap 19 whereby the golf bag 14 can be securely fastened onto the cart at its lower end.

A housing 20 is fixed into the upper end of the channeled body 15, this housing being somewhat box-like in shape, as best illustrated in Figure 6, and pivotally mounted in the housing 20 and adapted to operate in a slot 21 therein, is a latch element 22 which has an inturned hook or projection 23 at its lower end. This hook or projection is adapted to ride under a cross pin or bolt 24 which is at the inner end of a handle 25. This handle is pivoted at 26 in the housing 20 and, at this pivoted end, comprises two parallel strips or plates 25, preferably of the same material as the body 15. The latch element 22 is pivoted at 27 in the housing 20.

Also pivotally mounted between the two parallel portions or strips of the handle 25 and at a slight distance outwardly from its inner pivoted end is the upper end of a rod or link 28. The pivotal mounting for the upper end of this rod or link 28 is a pin or bolt 29. The remainder of the handle preferably comprises a rod or tube 30 which terminates in a knob 31.

The lower end of the rod or link 28 is pivotally attached to a pair of lugs 32 (Figures 2 and 9) which lugs form part of a cruciform structure 33 (Figure 9), the inner arm of which is pivotally connected by a pair of links 34 to the channeled body 15 by a pin or bolt 35. Another pin or bolt 36 connects the forward end of these links 34 to the cruciform structure 33.

The other two opposed arms of the structure 33 are pierced to receive pins or bolts whereby two pairs of links 37 and 38 are connected to said structure at their inner ends. The outer ends of these paired links 37 and 38 are connected by pins or bolts 39 and 40, respectively, to the inner unit of supporting struts for the wheels 42 of the cart.

These paired parallel supporting struts are preferably tubular or may be of other construction and each comprises two relatively movable units as best shown in Figure 5, the inner rod or tube of one pair being indicated by the reference numeral 43 and the inner rod of the other pair being shown at 44. The outer rod or tube adjacent the rod 43 is marked 45 and the one which cooperates with the rod or tube 44 is indicated at 46.

The upper ends of the tubes 43 and 45 are connected by pivot pins 47 and 48, respectively, to one end 52 of a yoke 49 which is rotatably mounted on the channel 15 at a point slightly above the center thereof. The upper ends of the other pair of tubes or rods 44 and 46 are joined by means of pivot pins 50 and 51, respectively, to the opposed end 53 of the yoke 49, as best shown in Figures 5 and 12.

The yoke 49 comprises essentially a shaft as shown in Figure 7 having a bifurcated extension at each end as indicated at 52 and 53, respectively. A cover 54 is placed over each assemblage of yoke and tube elements after which the upper ends of the tubes 43—46 are fastened in position, by pins or rivets 47—51 which also pass through openings in the covers 54 as well as openings in the bifurcated elements 52 and 53. The yoke 49—52—53 is held in pivoted association and relationship with the body 15 by means of a support 55 as best shown in Figure 8. The rod 49 is fitted onto the outer face of this support and is held in position thereon by means of a plate 56 which has a half-round medial portion whereby pivot action of the rod 49 and its bifurcated extensions 52 and 53 is freely permitted. The lower ends of the pairs of tubes or rods 43—45 and 44—46 are pivotally mounted in yokes 60 which are also preferably bifurcated and which support axle elements 61 upon which the wheels 42 are mounted (Figure 12).

As the handle 25—30 is raised, the rod or link 28 is pulled upwardly and this, in turn, raises the cruciform element 33 while at the same time maintaining it in a plane substantially parallel to the ground during its entire movement. This raising of the cruciform structure 33 is permitted because of its pivotal connection by the links 34 to the channeled body 15 and, at the same time, the lateral pairs of links 37 and 38 are pushed outwardly in a toggle-like movement to separate the lower ends of the struts, tubes or rods 43—45 and 44—46, thereby moving the wheels outwardly into an operative cart supporting position. The pivotal relationship of the tubes or rods 43—45 and 44—46 to the yokes or supports 52, 53 and 60 assures that the axles 61 are maintained in alignment and in a plane parallel to the ground at all times whereby the wheels 42 are always vertical and parallel to each other, particularly in locked operative position.

When the handle is fully raised, the latch 22 falls by gravity and its inner hook 23 rides under the pin 24 whereby the device is positively locked in extended and operative position.

A strap 62 and a supporting plate 63, similar to the strap 19 and supporting plate 17 at the bottom of the cart are provided at the top of the frame member 15, for supporting the upper end of a golf bag which is to be carried on the cart.

The body member 15, while illustrated as a channel form, may be of any other shape, such as tubular, and while it is preferred to have the same twistable or capable of resistance to torque it may also be rigid and still be serviceable. However, a slight tendency to allow twist enables the body member to act somewhat like a spring and thereby absorbs shocks or jars which would ordinarily be transmitted to the handle and thence to the operator.

The links or legs 43—45 and 44—46 may be made single instead of double in the event that a cheaper cart is desired or one of the legs may be made lighter than the other.

The latch 22 operates on the principle of a cam in that it hooks under the pin 24 and any tendency to jar or shake the latch will cause the same to work farther under the pin, making a tighter connection and rendering the same more difficult to disengage.

It will be evident that herein is provided a telescoping golf cart which presents many advantages over my earlier cart and also over other carts now on the market in that it is of a more simplified construction, is sturdier, more easily operated, has a lesser number of parts and, therefore, is not so likely to get out of order.

The fact that the wheels can be extended to a considerable distance apart, provides greater stability and the center of gravity of the resultant structure is quite low, especially when a golf bag is positioned thereon.

I am aware that many changes may be made and numerous details of construction varied throughout a wide range without departing from the principles of this invention and I, therefore, do not propose limiting the patent granted hereon otherwise than as necessitated by the prior art.

I claim as my invention:

1. A telescopic golf cart including a relatively long narrow body portion, a pair of wheels for supporting the body, a propelling handle pivotally mounted on the body, means for automatically moving the wheels into folded relationship when the handle is brought into folded position with respect to the body, said means including pairs of relatively shiftable pivoted wheel supporting arms, a rod and links connecting the arms to the handle, a support for the upper ends of the pivoted wheel supporting arms, said support pivotally mounted on the body, and means connecting the rod and links to the body, said means including a central cruciform support said cruciform support having one extension connected to the body, two extensions connected respectively to the right and left hand wheel supporting arms, and a fourth extension connected to the rod supported by the handle.

2. A telescopic golf cart including a relatively long narrow body portion, a pair of wheels for supporting the body, a propelling handle pivotally mounted on the body, means for automatically moving the wheels into folded relationship when the handle is brought into folded position with respect to the body, said means including pairs of pivoted wheel supporting arms, a rod and links connecting the arms to the handle, a support for the upper ends of the pivoted wheel supporting arms, said support pivotally mounted on the body and means connecting the rod and links to the body, said means including a further pair of links and a central cruciform supporting element, one extension of said element being connected to the links for the wheel supporting arms and another extension of said element being connected to the body by said further pair of links.

3. A telescopic golf cart including a relatively long narrow body portion, a pair of wheels for supporting the body, a propelling handle pivotally mounted on the body, means for automatically moving the wheels into folded relationship when the handle is brought into folded position with respect to the body, said means including pairs of pivoted wheel supporting arms, a rod and a series of links connecting the arms to the handle, a support for the upper ends of the pivoted wheel supporting arms, said support pivotally mounted on the body and comprising a central rod with bifurcated extensions, means connecting the rod and links to the body, said means including a forwardly extending pair of links and a central cross shaped supporting element, one extension of said cross shaped element being connected to the handle rod, two opposed extensions of the element being connected to the links for the wheel supporting arms and the fourth extension of said element being connected to the body by said forwardly extending links, said last named links being in turn pivotally connected to the body.

4. A telescopic golf cart including a relatively long narrow body portion, a pair of wheels for supporting the body, a propelling handle pivotally mounted on the body, means for automatically moving the wheels into folded relationship when the handle is brought into folded position with respect to the body and vice versa, said means including pairs of pivoted wheel supporting arms, a rod and links connecting the arms to the handle, a support for the upper ends of the pivoted wheel supporting arms, said support pivotally mounted on the body, means connecting the rod and links to the body, said means including another pair of links and also including a central cruciform supporting element, one extension of said element being connected to the handle rod, two opposed extensions of the element being connected to the links for the wheel supporting arms and the fourth extension of said element being connected by said last-named links to the body, said body connecting links being in turn pivotally connected to the body, and bifurcated wheel supporting extensions pivotally connected to the lower ends of the wheel supporting arms.

5. A telescopic golf cart including a relatively long narrow body portion, a pair of foldably mounted wheels supporting the body, a propelling handle pivotally mounted on the body, means for automatically moving the wheels into extended relationship when the handle is brought into extended position with respect to the body, said means including a rod and two pairs of pivoted wheel supporting arms, a support for the arms pivotally mounted with respect to the body, latch means for locking the handle in extended relationship, a latch supporting housing at the upper end of the body, means for pivotally supporting the latch and the end of the handle in said body, the inner end of the handle comprising a pair of parallel straps, a latch pin fixed in the straps, the space between the straps being adapted for the reception of the locking ends of the latch and the upper end of the wheel arm operating rod.

6. A telescopic golf cart including a relatively long narrow body portion, a pair of foldably mounted wheels supporting the body, a propelling handle pivotally mounted on the body, means for automatically moving the wheels into extended relationship when the handle is brought into extended position with respect to the body, said means including pairs of pivoted relatively slidable wheel supporting arms, a rod and links connecting the arms to the handle, a support for the upper ends of the wheel supporting arms, said support pivotally mounted with respect to the body, means connecting the rod and links to the body, said means including another pair of links and also including a central cruciform supporting element, one extension of said element being connected to the handle rod, two opposed extensions of the element being connected to the links for the wheel supporting arms and the fourth extension of said element being connected to the body, the wheel supporting arms being in pairs, the inner one of each pair connected to the handle operated links, and a support for the upper ends of the wheel supporting arms, said support pivotally mounted with respect to the body and a ring clamp forming part of said support.

JOSEPH F. CHAMBERLIN.

REFERENCES CITED

The following references are of record in the file of this patent:

UNITED STATES PATENTS

| Number | Name | Date |
|---|---|---|
| 44,936 | Clapp | Nov. 8, 1864 |
| 1,053,325 | Smith | Feb. 18, 1913 |
| 1,094,455 | McGill | Apr. 28, 1914 |
| 2,443,847 | Williamson | June 22, 1948 |
| 2,523,893 | Williamson | Sept. 26, 1950 |
| 2,563,033 | Greig | Aug. 7, 1951 |